Figure 1:
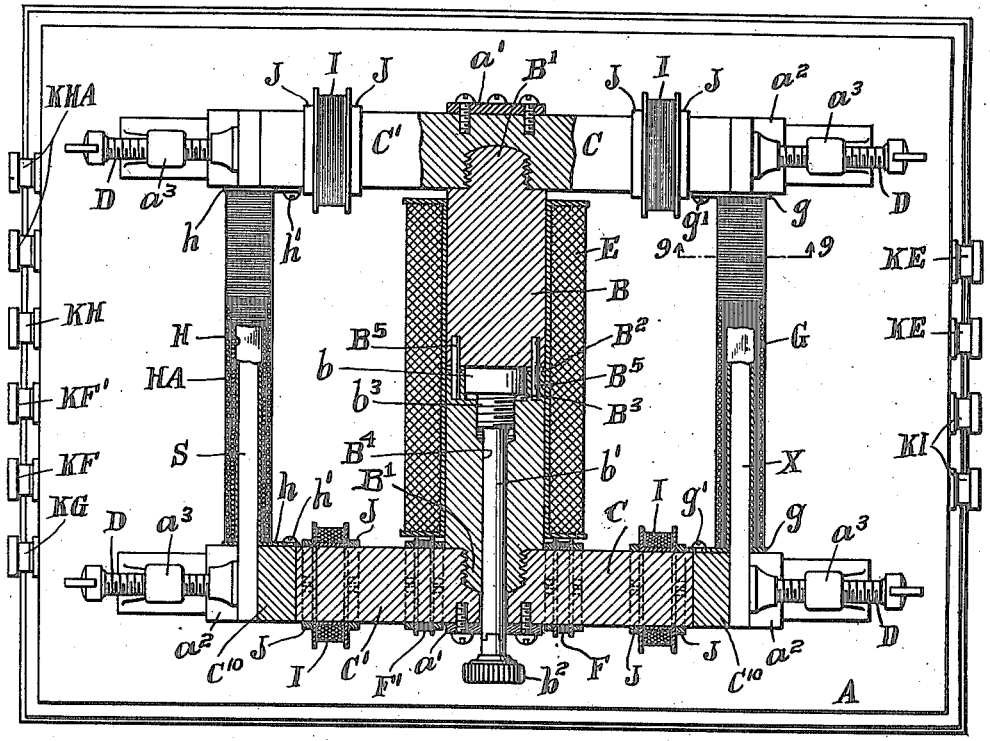

F. P. FAHY.
METHOD OF AND APPARATUS FOR TESTING MAGNETIC OBJECTS.
APPLICATION FILED JAN. 7, 1915.

1,196,223. Patented Aug. 29, 1916.
4 SHEETS—SHEET 1.

F. P. FAHY.
METHOD OF AND APPARATUS FOR TESTING MAGNETIC OBJECTS.
APPLICATION FILED JAN. 7, 1915.
1,196,223.
Patented Aug. 29, 1916.
4 SHEETS—SHEET 2.
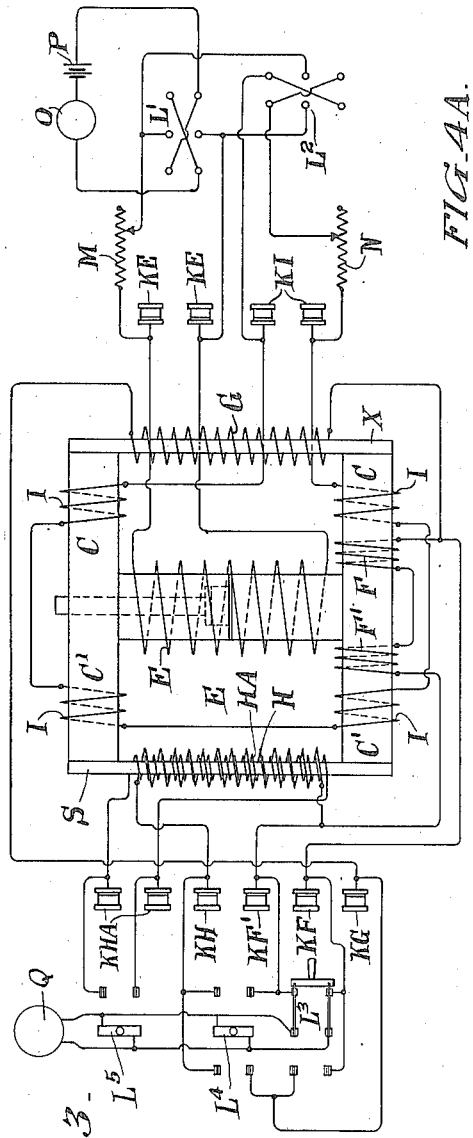
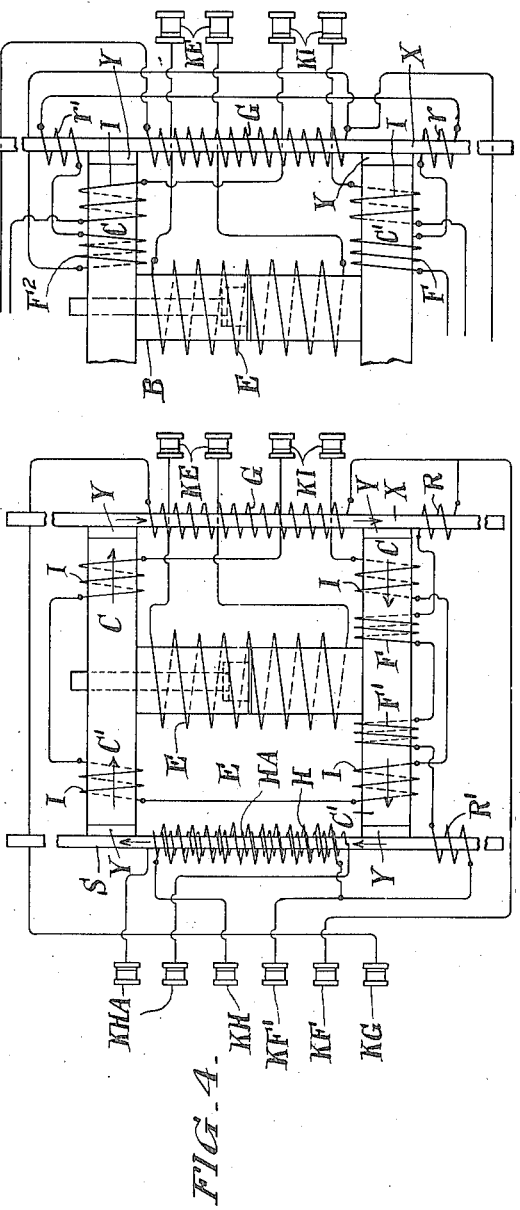

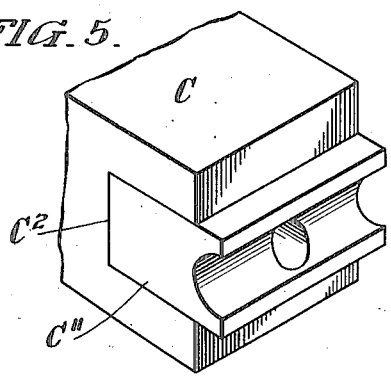
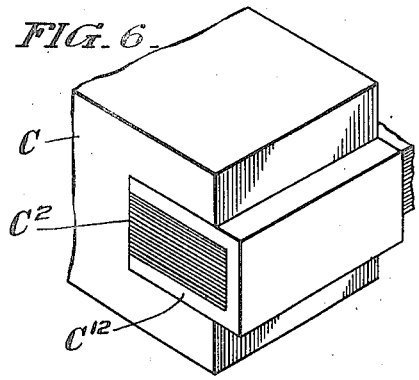
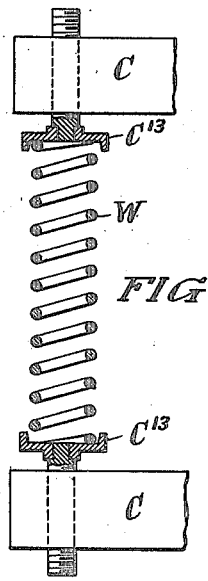
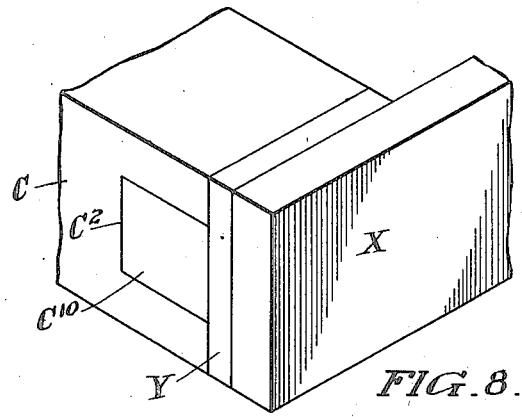
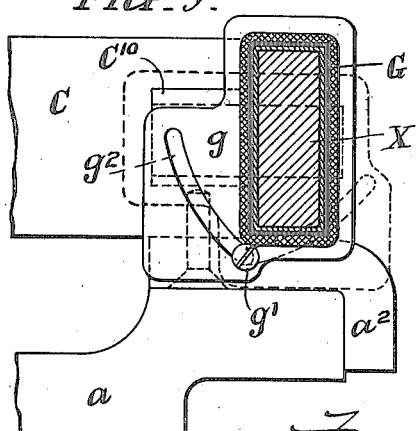

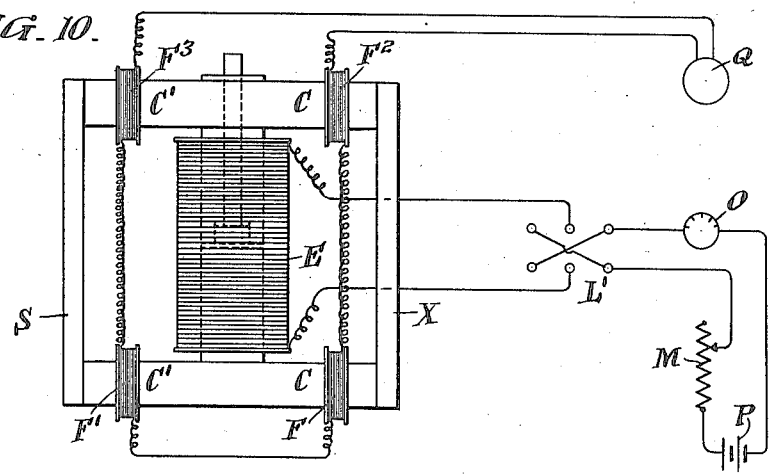
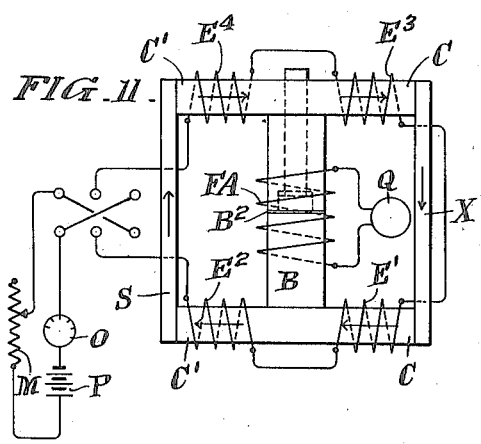
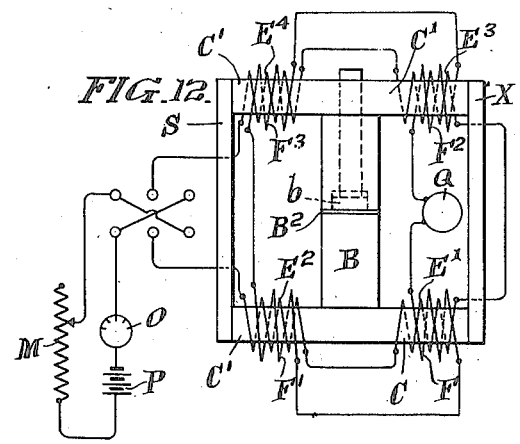
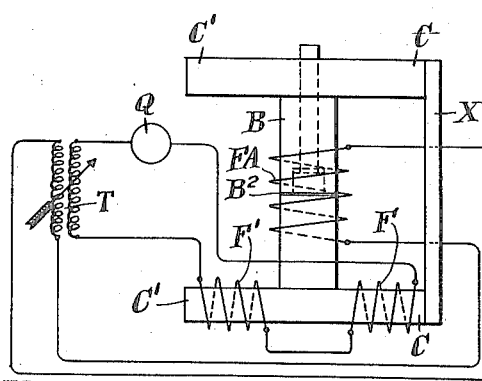

UNITED STATES PATENT OFFICE.

FRANK P. FAHY, OF WASHINGTON, DISTRICT OF COLUMBIA.

METHOD OF AND APPARATUS FOR TESTING MAGNETIC OBJECTS.

1,196,223. Specification of Letters Patent. Patented Aug. 29, 1916.

Continuation in part of application Serial No. 721,823, filed September 23, 1912. This application filed January 7, 1915. Serial No. 894.

*To all whom it may concern:*

Be it known that I, FRANK P. FAHY, a citizen of the United States of America, residing in the city of Washington, in the District of Columbia, have invented certain new and useful Improvements in Methods of and Apparatus for Testing Magnetic Objects, of which the following is a true and exact description, reference being had to the accompanying drawings, which form a part thereof.

The primary object of my invention is to provide a practical and effective method of and apparatus for measuring, or obtaining an indication of the magnetic characteristics of metallic bodies, with a view to determining certain magnetic properties of the metallic bodies or certain mechanical properties of these bodies which depend upon or vary with their magnetic characteristics.

More specifically, the object of my invention is to provide a comparatively simple and reliable device suitable for comparatively rapid manipulation and reading, and adapted for use as an instrument of precision both for comparing the magnetic characteristics of two bodies, and as an absolute permeameter to determine the permeability of a single body.

In carrying out my invention I provide a stationary core of magnetic material which may be laminated if the conditions of use make this desirable, but for most purposes need not be laminated. This core is shaped to provide two similar magnetic circuits each including an elongated individual air gap and a core portion common to both circuits. In the use of this instrument as a magnetic comparator, one of these air gaps is bridged by one, and the other air gap is bridged by the second of the magnetic bodies to be compared. Associated with the core of the apparatus are provisions for subjecting each branch circuit to the same magnetomotive force, and for inductively comparing the magnetic effects produced thereby in the two branch magnetic circuits.

The means employed in practice for subjecting the two branches of the magnetic circuit to similar magnetizing forces and for obtaining a measure of the flux variations produced thereby in the two magnetic circuits, comprise a magnetizing winding connected to a suitable extraneous source of electromotive force, and an induced current winding having its terminals connected to a suitable galvanometer or other indicating instrument. One or the other of these two windings must include two portions, one applied in inductive relation to one, and the other applied in inductive relation to the second of the separate branches of the magnetic circuit. The second of the two windings may include portions partly applied to one and partly applied to the other of the two branches of the magnetic core, or may be wholly applied to the common portion of the core.

Instead of employing the apparatus referred to above in a direct comparison of standard and test pieces, with said pieces simultaneously bridging one the one, and the other the second of the two elongated air gaps of the branch magnetic circuits, the standard and test pieces may be successively applied to one of the air gaps while the other is left unbridged. In such a use of the apparatus a comparison of the readings obtained when the standard and test pieces are separately employed to bridge one of the air gaps of the apparatus will furnish an indication of the difference between their magnetic characteristics. When the apparatus has once been calibrated, so to speak, by the use of readings obtained with a standard piece, or in some other manner, the readings obtained when the air gap of one only of the branch magnetic circuit is bridged will of themselves furnish a definite indication of the magnetic characteristics of the object bridging the air gap and if a suitable compensation is made for the tendency to dissimilar magnetic leakages in the two branch circuits, the apparatus may be used as an instrument of precision in determining the absolute permeability of said object.

My invention comprises effective provisions for compensating for the tendency to dissimilar magnetic leakages in the two branch magnetic circuits when one only of the two end air gaps is bridged by magnetic material, or when there is a considerable difference in the permeability of the two bridges across these air gaps.

The simultaneous use of standard and test pieces having about the same magnet characteristics possesses the important practical advantage of increasing the sensitiveness of the apparatus, since the quantity then required to be measured by the galvanometer or other indicating instrument may be the integrated electromotive force due to the differential of the flux variations in the two separate magnetic circuits. Where the standard and test pieces differ slightly in cross section, this variation in cross section may be compensated for by correspondingly varying the number of turns in different portions of the winding applied in part to one and in part to the other of the separate branches of the magnetic circuit. Practically the same sensitiveness may be imparted to the apparatus, however, when the test piece bridges one air gap and the other air gap is left unbridged by impressing a known integrated counter electromotive force on the induced current circuit to thereby minimize the quantity directly measured by the galvanometer or other indicating instrument employed.

The various features of novelty which characterize my invention are pointed out with particularity in the claims annexed to and forming a part of this specification.

For a better understanding of the invention, however, and its specific objects and the advantages possessed by it, reference should be had to the acompanying drawings and descriptive matter in which I have illustrated and described various embodiments of the invention.

Figure 2:
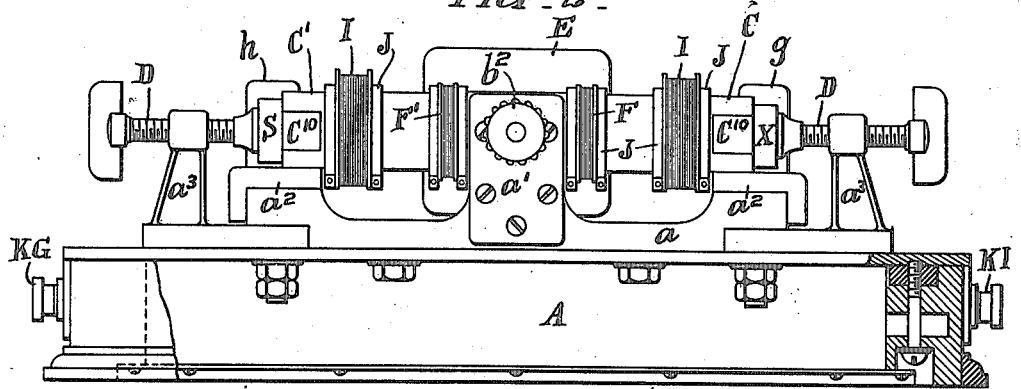

Of the drawings: Figure 1 is a plan view partly in section of a preferred form of apparatus embodying my invention. Fig. 2 is an elevation of the apparatus shown in Fig. 1. Fig. 3 is a diagrammatic representation of the apparatus shown in Fig. 1, with certain preferred external electric circuit connections thereto. Fig. 4 is a diagrammatic representation of the apparatus shown in Figs. 1 and 2 modified by the addition of certain windings. Fig. 4$^A$ is a view taken similarly to Fig. 4 showing a portion of a modified arrangement. Fig. 5 is a perspective view of a polar portion of the magnetic core at one end of one of the core arms C, illustrating a different pole face construction from that shown in Figs. 1 and 2. Fig. 6 is a view taken similarly to Fig. 5 and illustrating still another pole face construction. Fig. 7 is a view of a portion of the modified form of core construction especially devised for use in determining the magnetic characteristics of helical springs. Fig. 8 is a view of a portion of the magnetic core of an instrument as shown in Figs. 1 and 2 illustrating the use of non-magnetic spacers to produce air gaps in the branch magnetic circuits. Fig. 9 is a sectional elevation of a portion of the apparatus shown in Fig. 1, the section being taken on the line 9—9 of Fig. 1, and Figs. 10, 11, 12 and 13 are diagrammatic representations each showing the application to the core of such an instrument as is shown in Fig. 1 of a different modification of the winding arrangement employed.

In the preferred embodiment of my invention illustrated in Figs. 1 and 2, A represents the base of a machine upon which is mounted the magnetic core of the apparatus. The yoke or cross bar of the magnetic core which is of H shape, is formed at its ends with threaded portions B' screwed into threaded sockets formed in the transverse core portions, each of which comprises one arm C forming a portion of one, and a second an arm C' forming a portion of the other of the two magnetic circuits of which the yoke B forms a common portion. As shown, the core parts B and C are unlaminated.

For reasons explained hereinafter it is practically essential for some, and desirable for most conditions of use to provide an air gap in the core, and for many conditions it is desirable to adjust this air gap in order to vary its reluctance. For this purpose the core B is divided midway between its ends into two sections separated by the small air gap B$^2$, and one of the sections is formed with a cavity B$^3$ in its inner end. This cavity receives a piston like body $b$ of magnetic material which is adjusted toward and away from the adjacent end surface of the other section of the core portion B in order to form a more or less effective magnetic shunt about the air gap B$^2$. The shunt piece $b$ is formed with a stem portion $b'$ passing through an axial passage B$^4$ in the corresponding part of the core portion B. The outer end of the stem $b'$ is provided with a handle $b^2$ by means of which the stem may be rotated and thereby axially adjusted through the engagement of the threaded inner portion $b^3$ of the stem $b'$ with the threaded inner end of the passage B$^4$. The adjacent ends of the two sections of the core portion B are formed with registering sockets receiving non-magnetic dowel-pins B$^5$ holding the core parts in the desired relative position.

As shown, each core piece C C' is mounted on a specially shaped supporting member or beam $a$ of non-magnetic material secured to the platform or base A, being secured thereto by means of bracket members $a'$ and $a^2$ of non-magnetic material which are fastened by machine screws both to the supporting member $a$ and to the core portion C C'. The brackets $a^3$ secured to the base A adjacent each end of each core piece C C' are provided with threaded sockets for clamping screws D by means of which standard and test pieces may be clamped against the ends of either or both, the pairs of core arms C C and C' C', or against pole shoe parts secured thereto as hereinafter explained. In Figs. 1 and 2, a test piece X is clamped against the ends of the core arms C, and a standard piece S is clamped against the ends of the core arm C'.

The cross bar or yoke portion B of the core of the instrument, as shown in Figs. 1 and 2, is surrounded by a magnetizing coil E, and one of the core arms C is surrounded by a test coil F and the alined core arm C' is surrounded by a similar test coil F'. Four similar compensating coils I are mounted one on each of the four core arms. The test and compensating coils are each secured in place by corresponding pairs of split collars J clamped about the core arms, the ends of the usual spool of each of these coils being engaged by a corresponding pair of clamping rings J. The test piece X is surrounded by a coil G. The end flanges $g$ of the spool of the coil G are advantageously secured to the ends of the core arms C as by means of screws $g'$. When the coil G is made to fit about a test piece of oblong shape in cross section, as shown and as is frequently the case, the flange $g$ may well be provided with a curved slot $g^2$ to permit the coil to be secured in place with the long dimension of the cross section of the coil passage either transverse, or parallel to the length of the core arms C as shown by the full and dotted line positions respectively of Fig. 9.

H represents a winding exactly similar in the number and area of its turns to the winding G surrounding the standard piece X and having the end flanges $h$ of its spool secured to the core arms C' by screws $h'$ as the spool flanges $g$ of the winding G are secured to the core arm C. Preferably as shown, the spool $h$ also supports a measuring coil HA comprising more turns than the coil H and having its area turns carefully determined.

The ends of the different windings are connected, as shown, to suitable binding posts mounted on the base A, (see Figs. 1 and 3).

KE represents the binding posts to which the magnetizing winding E is connected. The four compensating coils I are connected in series between the binding posts KI. The two test coils F and F' are connected in series between the binding posts KF and KF'. One terminal of the coil G is connected to the binding post KF, and the other terminal to the binding post KG. One terminal of the coil H is connected to the binding post KF' and the other to the binding post KH. The terminals of the coil HA are connected to the binding posts KHA. It is to be observed also that all of the test windings, namely: the coils F, F', G and H are connected in series between the binding posts KG and KH, and in such manner that on a reversal of the magnetizing current through coil E, the integrated electromotive forces induced in the coils F and H act in the same direction and in opposition to the integrated electro-motive forces simultaneously induced in the coils F' and G.

In Fig. 3 I have illustrated an advantageous arrangement of external instrument and circuit connections to the binding posts of the magnetic testing instrument proper. As shown in this figure, M represents a variable resistance, O an ammeter, P a source of electro-motive current, and L' a reversing switch, all so connected to the binding posts KE that the resistance M, ammeter O and source of current P, may be connected in series with the magnetizing winding E with the current flow in either direction through the winding E from the source P. $L^2$ represents a reversing switch and N an adjustable resistance so connected to the binding posts KI, and to the switch L' that the compensating coils I and the variable resistance N, while in series with the ammeter O and source of current P, are in shunt to the winding E, and by manipulating the switch $L^2$ the direction of current flow through the compensating coils I may be reversed without a corresponding reversal of the current flow through the winding E. The binding posts KG, KF, KF', KH and KHA are connected to a suitable galvanometer or other current indicating instrument Q through the switches $L^3$, $L^4$ and $L^5$ in such a manner, as will be readily apparent to those skilled in the art, that the instrument Q may be connected at will either to the terminals of the coils F and F', to the terminals of the coil G, to the terminals of the coil H, to the terminals of the coil HA, or to the terminals of the circuit including the coils F, F', G and H all connected in series.

In the use of the apparatus illustrated for the magnetic comparison of objects one bridging the air gap between the arms C, and the other the gap between arms C', the object, generally speaking, is to establish the same difference in magnetic potential between the portions of the object contacting with or facing the ends of the core arms C, as between the similar portions of the object bridging the air gap between the core arms C', and then to measure the magnetic fluxes through the two objects. Similarly in the use of the apparatus for obtaining absolute measurements, the operation is to establish between the portions of an object contacting with, or facing the ends of the core arms C, the same difference in magnetic potential as exists between the free ends of the core arms C', and then to measure the magnetic flux passing through the said object, and the magnetic flux passing through a certain definite and restricted portion of the air path between the core arms C'. The impression of the magnetizing force on the common portion B of the two magnetic circuits will establish this desired equality in magnetic potential differences provided there is no differences in the magnetic characteristics of the paths, external to the core part B, through which the magnetic fluxes pass respectively between the core arms C, and between the core arms C'; but not if there are such differences, because of the different magneto motive force drops then prevailing in similar portions of the two branch magnetic circuits which will be manifested by different leakage characteristics in such circuits. The magnetic characteristics of each of these paths will depend of course, upon whether or not the corresponding core arms are connected by a standard or test specimen, and if so, upon the permeability, size and shape of the specimen, and the character of the contact between the specimen and the ends of the corresponding core arms.

The use of the apparatus as an instrument of precision for comparing standard and test pieces of different magnetic characteristics, or for obtaining an absolute measurement of the magnetic properties of a test piece, therefore, requires a compensation for dissimilar magneto-motive force drops in similar parts of the two magnetic circuits. This compensation can be very effectively secured, as hereinafter explained, by the use of the compensating coils I. I will first describe modes of using the apparatus, however, without bringing the compensating coils I into service, i. e., with the switch L² left open.

In comparing the magnetic properties of two objects as for instance, the standard and test pieces S and X shown in Figs. 1 and 2, I first clamp them snugly in place as shown, and it may be explained at this point that the pressure with which the bars are clamped in place is in general immaterial, all that is required being to insure firm contact and to prevent accidental displacement. I then adjust the circuit conditions as by manipulating the variable resistance M to obtain the current in the magnetizing coil E giving the desired magneto-motive force when the switch L' is closed. I then manipulate the switch L' to reverse the direction of current flow through the winding E several times so as to bring the standard and test pieces into a cyclic state magnetically. A reading is then taken of the deflection of the measuring instrument Q when connected to the binding posts KF and KF' and hence in series with the test coils F and F', or readings are taken when the instrument is connected to the terminals of the coil G and to the terminals of the coil H, or preferably all three of these readings are taken, the magnetizing current through the winding E being reversed once in making each reading. Either the one reading when the instrument is connected to coils F and F' which are connected to buck one another, or the difference between the two readings taken with the instrument connected first to the one and then to the other of the coils G and H will fairly indicate the difference in the magnetic characteristics of the standard and test pieces when the magnetic leakage of the two magnetic circuits are not very dissimilar. When all three readings are taken, however, the first furnishes a check on the resultant of the second and third readings, and a comparison of the different readings indicates the character of the leakage conditions prevailing. When the current through the coil E is reversed the instrument Q will, if of a suitable character, indicate the resultant of the integrated electro-motive forces generated in the coils connected in series therewith on the flux changes therethrough resulting from the reversal of the magnetizing current. The integrated value of the resultant electro-motive forces generated in the coils F and F' connected in series will be proportional to the difference between the electro-motive forces generated in the coils G and H disregarding unequal leakage conditions.

The most satisfactory indicating device Q which I have found for practical purposes, is a ballistic galvanometer having a relatively long period, but it will be understood that other forms of electrical measuring instruments may be employed, and in particular, that an alternating current instrument must be employed when the coil E is connected to a source of alternating current. With instrument Q a suitable ballistic galvanometer, the direction and extent of the needle deflection will be dependent upon the resultant flux changes in the portion or portions of the magnetic circuits surrounded by test coils connected to the instrument.

It is desirable for accurate work, to keep the magnetizing current flow through the coil E fairly constant. This involves the use of the ammeter O and adjustment of the resistance M in the particular apparatus shown. However, since a variation in the strength of the magnetizing current will under certain conditions of flux affect both the standard and test pieces to a practically equal extent, it is one of the advantages of my invention that a close adjustment of the magnetizing current is unnecessary. Instead of employing the battery P as indicated in Fig. 3, a commercial lighting or power circuit may be employed as a source of the magnetizing current, even when the voltage of such a circuit fluctuates considerably.

When it is desired to obtain a knowledge of the magnetic characteristics of an object, as the test piece X, by direct measurement instead of by comparison with a standard piece in the manner described, the standard piece is removed and the magnetizing force to which the piece X is subjected and the resulting induction therein may then be indicated by the readings of the galvanometer when the coils HA and G are respectively connected thereto, and the current through the magnetizing coil E reversed in each case.

As already stated, however, the use of the apparatus as an instrument of precision, either as a magnetic comparator or as an absolute permeameter, requires that a compensation be made for unequal magnetomotive force drops which may exist in corresponding parts of the two branch magnetic circuits and which result in dissimilar leakage characteristics of the two magnetic circuits. The compensation of this kind, necessary to a high degree of precision, can be readily obtained by means of the compensating coils I. These coils are preferably each mounted close to the free end of the core arm C or C' surrounded by it, and are connected so that when a current flow through them takes place, they tend to create a magnetic flux passing in one direction or the other along the closed path indicated by the arrows applied to Fig. 4. In use, the reversing switch L² is closed in such a fashion that the magnetizing effect of these compensating coils augments the magnetizing effect of the winding E on one, and subtracts from its magnetizing effect on the other of the two branch magnetic circuits. Which of the two circuits has its magnetizing force so strengthened depends upon the extent and distribution of the magnetomotive force drops in different portions of said branch circuits.

After the switch L² is closed to send current through the compensating coils in the proper direction, the current flow through the compensating coils is adjusted, as by manipulation of the resistance N, until the galvanometer Q, when the latter is connected in series with the coils, F, F', G and H indicates that the integrated value of the resultant electro-motive forces in said coils is zero when switch L is manipulated to reverse the current flow through the main magnetizing coil E and through the compensating coils I. The resultant of the electro-motive forces generated in the oppositely connected coils F and G is a function of the leakage in shunt to the test piece X, and the resultant of the electro-motive forces induced in the oppositely connected coils F' and H is a similar function of the leakage in shunt to the standard pieces. When the integrated value of these opposing resultant electro-motive forces becomes zero, this means that the leakage characteristics of the two branch magnetic circuits are equivalent, and since under these conditions the two leakage paths are the similar air paths one between the two poles formed by the ends of the core arms C and the other between the poles at the ends of the arms C', the equal leakages require that the magnetic potential difference between the free ends of the core arms C is equal to the magnetic potential difference between the free ends of the core arms C'. When this condition is brought about, the reading obtained by the galvanometer Q when connected to the terminals of the coil H will give the magnetizing force to which the body X and the body S are alike subjected, provided the body S is a standard, and the relation between the flux densities produced therein and the magnetizing forces producing them have been previously determined. Furthermore, the galvanometer Q, when connected to the terminals of the coil G will directly indicate the induction through the test piece X. Similarly a comparison of the readings obtained by the galvanometer when connected to the coil HA and to the coil G will give the relation between the magnetizing force and the induction produced thereby in a body X surrounded by the coil G, the body S being removed, in the use of the instrument as an absolute permeameter to determine the permeability of the body X.

While there should be substantial identity in shape between standard and test pieces for the most exact use of the instrument as a magnetic comparator, this is to be understood as necessarily applying only to the portions of the pieces between and in proximity to the pole piece. It will be apparent that the shape, and indeed the composition of the portions, if any, of the standard and test pieces S and X respectively extending away from the outer sides or edges of the core arms C and C', in any setting of the apparatus, will affect the readings obtained only by virtue of the magnetic leakage from these portions. Leakage sufficient to affect the results obtained will take place at such projecting portions only of the standard ends or test pieces as are in immediate proximity to the core legs, and if comparatively short portions of the projecting ends of the standard piece adjacent the core leg C' are similar to the corresponding portions of the test piece X, differences in the outer portions of the projecting ends of the standard and test pieces become unimportant.

The effect of the end extensions of objects such as long bars or rails being measured or compared, may be avoided or substantially minimized by the use of the supplementary similar coils R and R' shown in Fig. 4. The coils R and R' are coaxial with the coils G, and H respectively, and when in use are connected in series with the coils F, F', G and H, the coil R being so wound and connected that the electro-motive force generated in it by the leakage flux is added to that generated in the coil G and opposes that generated in the coil F, while the coil R' is wound and connected to aid the coil H in bucking the coil F'. When the coils are thus connected, the current through the compensating coils is adjusted until the resultant throw of the galvanometer connected in series with the coils F, F', R, R', G and H is zero when the current through the main magnetizing coil E is reversed. Under these conditions the effect of the leakage through the portions of the bar or bars under test or comparison and lying beyond the core leg C is substantially avoided, for the magnetic leakage through what may be regarded as the normal air path for leakage between the ends of the arms C is the same as the magnetic leakage through the similar leakage path between the ends of the arms C', and the equality of leakage means an equality in magnetic potential difference. Either or both coils R and R' may be cut out when the corresponding bodies under test or comparison are of such form as shown in Figs. 1 and 2 and do not project by the ends of the core arms connected by them, or if left in circuit, the coils then act like so much simple resistance.

It is customary in determining the magnetic characteristics of objects by tests made under an absolute testing method, to make them under fixed definite temperature conditions. In using my instrument, however, in comparing standard and test pieces, the temperature effect tends to become unimportant, as both the standard and test pieces are affected to practically an equal extent by changes in temperature above or below that used ordinarily in making tests by absolute methods.

While the arrangement of magnetizing and test coils illustrated in Figs. 1 and 2 and diagrammatically in Fig. 3 is that which I prefer to employ in the practical use of my invention, it will be obvious to those skilled in the art, that the magnetizing and testing windings may be arranged in many different ways and in Figs. 10 to 13, I have illustrated different winding arrangements which I may employ. The winding arrangement shown in Fig. 10 differs from that shown in Figs. 1 and 2, primarily in the fact that the two test coils F and F' are supplemented by similar test coils $F^2$ and $F^3$, one on each of the core arms C and C'. These coils are so connected that the electro-motive force generated in coil F is augmented by that induced in the coil $F^2$ which is on the other arm C while the coils F' and $F^3$ one on each arm C' aid one another in opposing coils F and $F^2$. Compensating coils such as coils I of Figs. 1 and 2 can be effectively employed with the test coils F, F', $F^2$ and $F^3$ of Fig. 10 provided test coils corresponding to the coils G and H are also employed.

In the modified winding arrangement illustrated in Fig. 11, the magnetizing coil E of Fig. 1 is replaced by four similar magnetizing coils E', $E^2$, $E^3$ and $E^4$ connected in series and located one upon each of the four core arms C and C'. In this figure, there is employed a single test coil FA symmetrically disposed upon the yoke B and connected to the ballistic galvanometer or other measuring device Q. The magnetizing coils E', $E^2$, $E^3$ and $E^4$ are connected in such a manner that they develop in the magnetic circuit a flux which is closed upon itself as indicated by the arrows.

When the flux change in the pieces S and X is the same, upon a change in the magnetizing force of the coils E', $E^2$, $E^3$ and $E^4$, no flux passes through the common core portion B since the magnetic potential difference between the ends of the cross bar B is zero. When the flux change in the pieces S and X differs, however, a flux will pass through the core portion B since there will be no longer a zero potential difference between the ends of the core portion B and consequently the needle of the indicating device Q will be deflected. The direction of needle deflection and its extent will be dependent, of course, upon the difference in the flux changes in the two branches of the magnetic circuit.

Another example of an arrangement of the magnetizing and induced current windings is shown in Fig. 12 wherein the coils E', $E^2$, $E^3$ and $E^4$, are arranged as in Fig. 11, and are surrounded respectively by testing coils F, F', $F^2$ and $F^3$ arranged as in Fig. 10.

With one air gap only between the ends of the arms bridged by a magnetic body, the quantity measured by the instrument Q is much larger, and the sensitiveness of the apparatus correspondingly less, than when both air gaps are bridged in the direct comparison of two magnetic objects such as the standard and test pieces S and X shown in Figs. 1 and 2, but a compensation in this respect for the omission of the magnetic bridge between one pair of core arms may be obtained by the use of a variable mutual inductance. One arrangement of this character is shown in Fig. 13. In this figure, the primary of the variable mutual inductance T is connected in series with the magnetizing coil E and the secondary of the mutual inductance T is connected in series with the test coils F and F'. In the use of the mutual inductance T, the latter is so adjusted that the flux change through the secondary coil, due to a reversal of the current in its primary coil produces an integrated electromotive force in the secondary coil which is equal to the integrated electro-motive force which would be induced in a test coil having a number of turns similar in number of turns to the coils F' and F², if such a coil were uniformly wound on a standard bar S when arranged as shown in Figs. 1 and 2. The coil F' and the secondary of the mutual inductance T are so connected in series that the sum of their integrated electro-motive forces opposes the electro-motive force generated at the same time in the coils F.

Considering the device purely as a magnetic comparator the use of a variable inductance in place of a standard piece, possesses a number of advantages: First, the necessity for a standard specimen of the known composition and size is avoided and the test specimens are compared to a fixed standard of flux change. Second, the mutual inductance being variable, it may be calibrated and adjusted so that its setting in any particular test will take into account the area of the test specimen. When the device is used as an absolute permeameter compensation such as is afforded by the coils I of Figs. 1, 2 and 3 is required and this necessitates the use of additional coils G and H or equivalent test coils.

In testing or comparing long bars, it may be desirable to avoid ill effects from dissimilar contacts with the two core arms bridged by each bar to put a test coil on each core arm as in Fig. 10, and to divide the coils R and R' applying to the two halves of each divided coil, one to one, and the other to the second of the projecting ends of the bar. This division of the coils is illustrated in Fig. 4^A wherein F and F² represent the test coils on the core arms C, and $r$ and $r'$ represent the two parts into which the coil R of Fig. 4 has been divided.

The instrument disclosed herein is capable of use for many different purposes. It may be employed to determine the magnetic characteristics of materials intended for use under conditions where their magnetic properties are the important characteristics. For instance, it may be used to determine or compare the permeability, residual induction, and coercive force of magnetic materials. Where results of the highest accuracy are required in the use of the instrument as a magnetic comparator, the standard piece may be of known magnetic characteristics determined by the most accurate absolute method known.

The apparatus is well adapted and was in part devised for use in determining such physical properties as elasticity, ductility and tenacity, and that somewhat indefinite property called hardness, in so far as these properties are varied in a metallic body of given basic chemical composition by the heat treatments to which it has been subjected by comparing this object with another object which is of the same shape and the same basic chemical composition but has been subjected to known or standard heat treatment. For instance, the objects compared may be similar sections of the same rolled bar and the standard bar annealed while the test piece is hardened.

This application is to be regarded in part as a continuation of my earlier application, Serial No. 721,823, filed September 23, 1912, wherein I claim the method just described, of determining changes in the physical characteristics of objects of the same basic chemical composition resulting from the heat treatments to which they have been subjected.

The apparatus may be used also to determine the existence, and to some extent the character of welds, flaws, cracks, laminations, pipes, air holes and blow holes in rolled, cast or forged metallic bodies, to determine the extent of case hardening, to indicate differences in magnetic characteristics and mechanical properties of objects of different basic chemical composition, and to roughly indicate the chemical composition of ferruginous substances containing elements affecting their magnetic characteristics such as carbon, manganese, silicon, nickel, tungsten, vanadium and chromium.

To accommodate the different uses to which a single instrument may be put, I prefer to provide for the use of special pole faces of magnetic material to suit the form and characteristics of the pieces tested. This I do in the apparatus shown in Figs. 1 and 2 by forming open ended grooves or slots extending parallel to the length of the standard and test pieces which may be connected thereto. When the pieces to be tested or compared are bars rectangular in cross section as shown in Figs. 1 and 2, I fill these grooves or slots with smooth fitting plugs $C^{10}$, see Fig. 8; of magnetic materials which extend flush with the end and edge surfaces of the core arm C.

In testing and comparing round bars, I replace each plug $C^{10}$ by such a plug $C^{11}$, formed with rounded grooves to receive and fit the rod to be tested, as is shown in Fig. 5.

In Fig. 6, I show a U shaped piece $C^{12}$ of magnetic material adapted to be received in the core arm cavity $C^2$ and especially intended for use in holding the end of a group or bundle of laminæ Z when it is desired to examine the magnetic characteristics of such laminæ. It is found in magnetizing a bundle of laminæ that efficient metal to metal contact can only be obtained through the edge surfaces of the laminæ. When the latter are assembled as shown in Fig. 6, one end edge of each lamina is in contact with the corresponding core arm at the bottom of the recess C² therein, while the other end edge of each lamina is in direct contact with the yoke portion of the piece C¹².

Where the instrument is especially intended for use in testing or comparing magnetic properties of helical springs as to determine the temper thereof, I may provide the threaded polar extensions C¹³ as shown in Fig. 7, each of these extensions terminating in a head formed with a recess or seat receiving a corresponding end of the spring W.

By providing the magnetic core of the apparatus with a definite gap or gaps symmetrically disposed with respect to the branch circuits such as is formed by the air gap B² in the core yoke B, a number of important advantages are obtained. One of these arises from the fact that since the major portion of the reluctance of the magnetic circuit as a whole, when both test and standard pieces are on, is then found in such a gap or gaps the tendency of the gap or gaps is to maintain a practically constant magneto-motive force drop between the ends of the common core portion, and any ordinary variation in reluctance in successive test specimens of the same general character will not modify the magneto-motive force drop except in a very small degree. This makes it possible to subject the objects tested in successive tests to a practically constant magnetic potential difference, without altering the magnetizing current, which is obviously conducive to uniform results.

A second advantage, due to the maintenance of a practically uniform magnetic potential difference in successive tests, is had from the fact that the magnetic leakage conditions in the different tests remain practically constant.

A third advantage had with the gap or gaps in the magnetic core, is due to the fact that a pole is formed at each gap end at the instant at which the magnetizing circuit is broken. These poles act in a manner tending to demagnetize both the core of the apparatus and the test and standard pieces, thereby lowering the time constant of the magnetic circuit and permitting the use of an indicator of shorter period than would otherwise be required.

A fourth advantage of the provision of a gap or gaps in the magnetic core is due to the fact that the gaps minimize the effect of poor contact of either the test or standard piece, or both, by reason of scale or rust on such pieces, since the added reluctance due to such poor contact is but a small part of the total reluctance present.

A fifth advantage of the provision of the gap or gaps in the magnetic core is due to the fact that the gaps render the magnetic quality of the material entering into the construction of the core of minor importance, so that it is possible to construct a number of cores of material which varies considerably in magnetic characteristics and yet obtain practically uniform results under the same magneto-motive force conditions.

The adjustability of the air gap, had with the apparatus shown in Figs. 1 and 2 by changing the position of the shunt block $b$, is obviously advantageous in permitting the reluctance of the core as a whole to be varied to meet conditions. This adjustability permits the residual magnetic effect remaining when the magnetizing circuit is broken to be reduced to zero and thereby facilitates a determination of the true residual induction of the test specimen. The adjustability of the gap permits the demagnetizing effect of the gap to be varied at will which is of especial utility in hysteresis determinations. Preferably I employ a single gap located centrally in the cross bar A, as shown in Figs. 1 and 3, since this is the most advantageous position to control leakage and to provide a higher effective magneto-motive force near the pole shoes than at the center of the test or standard bar, so as to compensate for the reluctance due to necessarily imperfect contact at such shoes and to make the flux in the test and standard pieces more uniform. I may also employ with the apparatus shown in Fig. 1, gaps due to the insertion of brass or other non-magnetic spacers Y, see Figs. 4 and 8, between the test or test and standard pieces and the corresponding polar ends of arms C and C'. Where four similar spacers Y are inserted one between each core arm C and C' and the test and standard pieces being compared, as shown in Fig. 4 these spacers similarly increase the reluctance of the two magnetic circuits and may be used to augment the effect of, or in lieu of the gap B². The gaps between a test or standard piece and the corresponding core arms have the special advantage that they also tend to a more uniform flux distribution from one end to the other of the tested standard bodies.

While in accordance with the provisions of the statutes I have disclosed and explained the best forms of my invention now known to me, it will be apparent to those skilled in the art that changes may be made in the modes of operation and forms of apparatus disclosed without departing from the spirit of my invention, and that certain features of the invention may sometimes be used without a corresponding use of other features.

Having now described my invention, what I claim as new and desire to secure by Letters Patent is:

1. Means for determining magnetic characteristics of a metallic object comprising in combination a stationary magnetic core shaped to provide two separate magnetic circuits each including a core portion common to both circuits and an air gap individual to each circuit, one of which is adapted to be bridged by an object to be tested, means for impressing substantially similar magnetizing forces on the two separate magnetic circuits and means for measuring the differential of the inductive effects of the flux variations in said circuits.

2. Means for determining magnetic characteristics of a metallic object comprising in combination a stationary magnetic core shaped to provide two separate magnetic circuits each including a core portion common to both circuits and an air gap individual to each circuit, one of which is adapted to be bridged by an object to be tested, a magnetizing winding for impressing similar magnetizing forces on the two separate magnetic circuits, and a winding in which an electro-motive force is created by flux variations in said core, one of said windings including one portion in inductive relation with one of said separate magnetic circuits and a second portion in inductive relation with the other of said separate magnetic circuits.

3. Means for determining magnetic characteristics of a metallic object including in combination a stationary magnetic core comprising a core body and a pair of oppositely disposed branches extending from each end thereof, whereby two separate magnetic circuits are formed each of which includes one of said branches at each end of said core body and the air gap between their outer ends, said core body being common to both circuits, a magnetizing winding for impressing substantially equal magnetizing force on the two branch circuits, and an induced current winding adapted to have an electromotive force induced therein proportional to the differential of the flux variations in said magnetic circuits, an indicating instrument connected to the last mentioned winding, and means for minimizing the electromotive force impressed on said instrument when one of said air gaps is bridged by the object to be tested by a definite amount to approximately compensate for the effect of the change in reluctivity in said magnetic circuit occurring when said object bridges the air gap thereof.

4. Means for determining magnetic characteristics of a metallic object comprising in combination a stationary magnetic core shaped to provide two separate magnetic circuits each including a core portion common to both circuits and an air gap individual to each circuit, one of which is adapted to be bridged by an object to be tested, spacers of high reluctivity adapted to be interposed between the said object and the core at the ends of the said air gap bridged by the object, means for subjecting the two magnetic circuits to the same magnetizing forces, and means for measuring the differential of the inductive effects of the flux variations in said circuits.

5. Means for comparing the magnetic characteristics of two objects comprising in combination a magnetic core shaped to provide two similar magnetic circuits each including a core portion common to both circuits and an air gap individual to each circuit, said air gaps being adapted to be bridged one by one and the other by the second of the objects to be compared, spacers of high reluctivity interposed between said objects and said core to similarly increase the reluctivity of the separate magnetic circuits, means for impressing substantially similar magnetizing forces on the two separate magnetic circuits, and means for measuring the differential of the inductive effects of the flux variations in said circuits.

6. Means for determining magnetic characteristics of a metallic object including in combination a stationary magnetic core structure comprising a body portion and an opposed pair of lateral branches extending from each end thereof whereby two separate magnetic circuits are formed each of which includes one of said lateral branches at each end of said core body and the air gap between their outer ends, said core being common to both circuits and said core structure including a portion or portions of relatively high reluctivity and similarly increasing the reluctivity of the two separate magnetic circuits, means for impressing substantially similar magnetizing forces on the two separate magnetic circuits, and means for measuring the differential of the inductive effects of the flux variations in said circuits.

7. Means for comparing the magnetic properties of two objects comprising in combination a stationary magnetic core shaped to provide two similar magnetic circuits each including a core portion common to both circuits and an air gap individual to each circuit and adapted to be bridged by one of the objects to be compared, means for impressing substantially similar magnetizing forces in the two magnetic circuits, and means for comparing the inductive effects of flux variations in the two circuits.

8. Means for determining magnetic characteristics of a metallic object comprising in combination a magnetic core shaped to provide two similar magnetic circuits each including a core portion common to both circuits and an air gap individual to each circuit one of which is adapted to be bridged by the object to be tested, means for impressing substantially similar magnetizing forces on the two separate magnetic circuits, and means for comparing the inductive effects of flux variations in the two circuits, said core being formed with a gap or gaps similarly increasing the reluctance of both of said magnetic circuits.

9. Means for determining magnetic characteristics of a metallic object comprising in combination a magnetic core shaped to provide two similar magnetic circuits each including a core portion common to both circuits and an air gap individual to each circuit one of which is adapted to be bridged by the object to be tested, means for impressing substantially similar magnetizing forces on the two separate magnetic circuits, and means for comparing the inductive effects of flux variations in the two circuits, said core comprising relatively adjustable parts adapted to effect similar variations in the reluctance of both of said magnetic circuits.

10. Means for determining magnetic properties of two objects comprising in combination a magnetic core shaped to provide two similar magnetic circuits each including a core portion common to both circuits and an air gap individual to each circuit one of which is adapted to be bridged by an object to be tested, means for impressing substantially similar magnetizing forces on the two branch circuits, and means for comparing the inductive effects of flux variations in the two circuits, said common core portion being formed with a gap similarly increasing the reluctance of both branch circuits.

11. Means for comparing the magnetic properties of two objects comprising in combination a magnetic core shaped to provide two similar magnetic circuits each including a core portion common to both circuits and an air gap individual to each circuit and adapted to be bridged by one of the objects to be compared, means for impressing substantially similar magnetizing forces on the two branch circuits, and means for comparing the inductive effects of flux variations in the two circuits, said common core portions comprising two similar portions of magnetic material placed end to end and spaced a determined distance apart.

12. Means for comparing the magnetic properties of two objects comprising in combination a magnetic core shaped to provide two similar magnetic circuits each including a core portion common to both circuits and an air gap individual to each circuit and adapted to be bridged by one of the objects to be compared, means for impressing substantially similar magnetizing forces on the two branch circuits, and means for comparing the inductive effects of flux variations in the two circuits, said common core portions comprising two portions of magnetic material placed end to end and spaced a determined distance apart, and an adjustable magnetic body forming a magnetic shunt about the gap between said portions.

13. Means for comparing the magnetic properties of two objects comprising in combination a magnetic core shaped to provide two similar magnetic circuits each including a core portion common to both circuits and an air gap individual to each circuit and adapted to be bridged by one of the objects to be compared, means for impressing substantially similar magnetizing forces on the two branch circuits, and means for comparing the inductive effects of flux variations in the two circuits, said common core portions comprising two portions of magnetic material placed end to end and spaced a determined distance apart, one of said portions being formed with a longitudinal passage therein and a magnetic body adjustably received in said passage and forming a magnetic shunt about the gap between said portions.

14. Means for determining magnetic properties of an object comprising in combination a magnetic core shaped to provide two similar magnetic circuits, each including a core portion common to both circuits and an air gap individual to each circuit one of which is adapted to be bridged by an object to be tested, a magnetizing coil surrounding said common core portion, and other coils surrounding separated portions of the two circuits and so relatively connected that the voltage induced therein by the flux variation in each of said magnetic circuits opposes the voltage induced by the flux variation in the other circuit and means for measuring the current flow induced in said other coils by inequalities in the flux variations in the two circuits.

15. Means for determining the magnetic characteristics of a metallic object comprising in combination a stationary magnetic core, shaped to provide two separate magnetic circuits each including a core portion common to both circuits and an air gap individual to each circuit, means for impressing substantially similar magnetizing forces on the two separate magnetic circuits tending to magnetize the common core portion in the same direction, means for impressing on said magnetic circuits magnetizing forces tending in one circuit to aid the corresponding first mentioned force, and in the other circuit to oppose the corresponding first mentioned force, and means for comparing the inductive effects of the flux variations in said circuits.

16. The method of determining the magnetic characteristics of an object bridging one, or comparing the magnetic characteristics of two objects each bridging a corresponding one of the two air gaps of a stationary magnetic core shaped to provide two separate magnetic circuits each including a core portion common to both circuits and one of said air gaps, which consists in subjecting the core to magnetizing forces causing fluxes to flow in the same direction through said common core portion to, and in parallel through, the two separate circuits and to magnetizing forces tending to cause a flux to flow in series through the non-common portions of said separate circuits and for adjusting said forces until similar magnetic leakages occur across each of said air gaps regardless of the fluxes passing through any magnetic shunt which may be applied to either gap.

17. Means for determining magnetic characteristics of a metallic body comprising in combination a stationary magnetic core shaped to provide two separate magnetic circuits each including a core portion common to both circuits and an air gap individual to each circuit, a magnetizing winding surrounding individual portions of the separate magnetic circuits adjacent each air gap, and means for causing a magnetizing current of regulated intensity to pass in series through the last mentioned windings.

18. Means for determining magnetic characteristics of a metallic body comprising in combination a stationary magnetic core shaped to provide two separate magnetic circuits each including a core portion common to both circuits and an air gap individual to each circuit, a test coil so disposed with respect to one of said air gaps as to surround a magnetic body bridging said air gap, and a second test coil similarly disposed with respect to the other gap and similar in the number and area of its turns to the first mentioned coil.

19. Means for determining magnetic characteristics of a metallic body comprising in combination a stationary magnetic core shaped to provide two separate magnetic circuits each including a core portion common to both circuits and an air gap individual to each circuit, a test coil so disposed with respect to one of said air gaps as to surround a magnetic body bridging said air gap, a second test coil similarly disposed with respect to the other gap and similar in the number and area of its turns to the first mentioned coil, and a measuring coil concentric with and comprising a larger number of turns than said second test coil.

FRANK P. FAHY.

Witnesses:
CHAS. W. BURROWS,
WM. R. DE LASHMUTT.